Patented May 1, 1934

1,956,697

UNITED STATES PATENT OFFICE 1,956,697

METHOD FOR PREPARING, SOWING, AND PLANTING IN FOREST AND FIELD GROUND

Truls Rognerud, Hunsdalen Pr. Hen St., Norway

No Drawing. Application April 27, 1933, Serial No. 668,293. In Norway August 29, 1932

1 Claim. (Cl. 47—58)

This invention relates to improvements in methods for preparing ground in forests and fields for the cultivation thereof and to promote the germination and growth of plants, trees and the like from seeds, the object of the invention being to provide an improved method by means of which ground may be cheaply and quickly cleared of grass, weeds, brush and other undesirable growth and prepared for the growth of plants, trees, vegetation and the like, and consists in burning limited areas at the places to be planted or sown by means of a flame so directed on such spaces or spots as to burn the soil to a depth sufficient to destroy and consume subterranean roots as well as upper growth, and thereby make depressions in the surface of the soil favorable to the reception and retention of seeds and rain water and to convert such roots and the like to ashes which serve to fertilize the soil at such localized places or spots and to also sterilize the soil at such spots by the destruction of such roots and the like and thereby prevent the growth of grass, seeds and undesirable plants at such spots, as hereinafter described and claimed.

In carrying out my improved method I destroy undesirable vegetation both above and below the soil in localized areas which are to be planted by burning the soil at such places by means of mechanically controlled flame so deeply as to form depressions in the surface of the soil for the reception of seeds and the retention of rain water and the like and to also destroy grass, seeds, brush and other undesirable vegetation at such spots both at the surface and at a depth below the surface and to convert such vegetation, roots and the like to ashes which serve to fertilize the soil at such spots, as will be understood.

Any suitable fuel may be used such as oil or gas, and the flame may be applied by any suitable burner, which burner may be provided with any suitable valve by means of which a flame may be controlled.

In connection with the burner may be arranged a rake, a claw or another suitable tool for scratching the ground, if desired simultaneously with the burning operation. Such a tool projects a certain length in front of the mouth piece of the burner and may also serve as a support during the burning operation. It also may assist in preventing the burner and thereby the flame from coming too near to the ground, whereby the flame might be extinguished for lack of sufficient admission of air.

By this method of burning the ground in spots a complete preparation of the ground is obtained. The flame can be made to play exactly on the spots, where it is desired to sow or plant, and each spot can be burnt separately to the size required in each case and to such a depth as to convert all subterranean roots and the like to ashes and thereby fertilize the soil and also sterilize the same to prevent or retard the growth of undesirable grass, seeds, plants or other undesirable vegetation and to form depressions in the surface of the soil for the reception of the seeds or plants and also for the reception and retention of rain water and the like so that the germination and growth of the seeds is greatly promoted.

Burning by this method can also take place near to plants and trees without damage to them. In such spots for sowing or planting the ground vegetation, and also eventually under all conditions the turf covering, can be partly or completely burnt, so that the surface vegetation is destroyed, and the lower vegetation damaged or destroyed. During the process the operator is in complete control of the extent and degree of burning desired in the different kinds of ground and soil.

By controlling the degree of burning in a suitable manner in accordance with the several kinds of grass or weeds, heather and moss, which are to be burnt, sowing or planting spots may be obtained in which the development of undesirable vegetation is prevented and in which an eventual cover of raw or acid humus will after lapse of some time again be transferred to fresh soil, rich in bacteria, by the free action of air and sun.

The systematic burning causes simultaneously a uniform fertilizing with ashes of the sowing or planting spots and the layer of ashes is not so dense and heavy that it prevents germination. Such a uniform fertilizing is not likely to be obtained by usual burning.

Usual burning has as previously mentioned been used to a comparatively small degree owing to the difficulties connected thereto. Consequently a fertilizing with ashes produced by burning has hitherto been of minute use. By means of my new methods, however, I obtain the advantage of fertilizing the sowing or planting spots by means of ashes containing nutrition of favorable importance to the trees, namely potash and phosphoric acid. The ashes will be lixiviated and the soil receive the valuable materials of the same previously to the sowing or planting.

The spots will usually be well adapted for sowing or planting in the following spring, and are then also ready to receive the first natural seed. If it is found necessary the turf cover may, in addition to the burning, be broken up by a suitable implement. The burning operation involves no fire risk, as the method permits the work to be executed to advantage on wet ground and even when it is raining.

The method further offers the advantage, that the surrounding natural vegetation—usually regarded as a detriment to forest culture,—will protect the young plants during the first years of their growth, owing to the small limited spots. This advantage is of importance especially in weatherbeaten tracts, for instance in heather covered hills, where,—when ordinary burning operation is attempted,—large openings will appear, in which small, weak plants in open places easily will be damaged or destroyed by the wind.

Further may be mentioned that no weed is too heavy to be successfully dealt with by the method. Even brush, roots and other vegetation which is to be removed may be destroyed by means of my method. A simple flame treatment of the bark in the spring time will kill such growth.

It will dry up on the root in the same way as if a ring of bark had been removed from the stem and new shoots from the root will not appear after trees, bush and other plants which are dried and killed in this manner.

While I have described my novel method, it is evident that it may be modified for several other uses without departing from the spirit and scope of my invention, and I desire, that only such limitations shall be imposed as are indicated in the appended claim.

I claim:

The herein described method of preparing ground in forest and field for promoting natural propagation of vegetation and preparing ground for sowing seeds and for planting, consisting in destroying undesirable vegetation both above and below the soil in localized areas which are to be planted by burning the soil at such places by means of mechanically controlled flame so deeply as to form depressions in the surface of the soil for the reception of seeds and the retention of rain water and the like and to also destroy grass, seeds, brush and other undesirable vegetation at such spots both at the surface and at a depth below the surface and to convert such vegetation, roots and the like to ashes which serve to fertilize the soil at such spots.

TRULS ROGNERUD.